Sept. 15, 1964     E. C. HANDWERK     3,149,194
FRACTIONATING APPARATUS

Filed Aug. 7, 1958     2 Sheets—Sheet 1

*INVENTOR.*
ERWIN C. HANDWERK
BY *Kasper T. Serijan*
         ATTORNEY
*Paul W. Garbo*
         AGENT Sept. 15, 1964     E. C. HANDWERK     3,149,194
FRACTIONATING APPARATUS
Filed Aug. 7, 1958     2 Sheets-Sheet 2

INVENTOR.
ERWIN C. HANDWERK
BY *Kasper T. Serijan*
ATTORNEY
*Paul W. Farbo*
AGENT 3,149,194
FRACTIONATING APPARATUS
Erwin C. Handwerk, Lehighton, Pa., assignor to American Metal Climax, Inc., New York, N.Y., a corporation of New York
Filed Aug. 7, 1958, Ser. No. 753,755
8 Claims. (Cl. 266—33)

This invention relates to the purification of metallic vapors and more particularly to apparatus adapted for the fractional distillation of zinc to effect its separation from contaminants such as iron, lead and cadmium. This application is a continuation in part of my copending application Serial No. 718,596, filed March 3, 1958, which in turn is a continuation in part of my copending application Serial No. 638,849, filed February 7, 1957, said applications having eventuated on May 9, 1961, in U.S. Patents 2,983,493 and 2,983,494, respectively.

The earlier of the aforesaid copending applications discloses an improved fractionating column formed of refractory materials in which a plurality of trays are at various levels supported by their edge portions fitted loosely in vertically spaced horizontal grooves in the inner sides of the walls of the column. While this column offers several advantages over prior columns, such as greater simplicity, lower cost and more durability, the later filed application discloses an arrangement of the trays within a fractionating column which ensures improved contact between ascending hot vapors and descending liquid condensed therefrom. The more intimate contact between vapors and liquid effected with the trays of the later application which have an upper face subdivided to hold a stepped-down series of shallow pools of liquid condensed from the vapors leads to more efficient fractionation. An increase in fractionation efficiency makes possible a decrease in the height of the fractionating column or tower. With fractionating towers made of refractory materials, any measurable reduction in the height of the structure is clearly reflected in both the original cost and the cost of maintenance. It is not difficult to understand that as a column built of refractory material and exposed to elevated temperatures is made taller the greater is the tendency of that column to develop cracks and leaks.

The inventions of my aforesaid copending applications have presented the opportunity of designing fractionating towers for commercial operation on a scale heretofore not possible. Whereas prior fractionating towers, such as those shown in U.S. Patents, Nos. 1,994,345 to 1,994,358, inclusive, are practical for relatively low capacities in terms of the number of tons per day of distilled zinc that can be produced thereby, the towers of my aforesaid applications can be readily built and operated for substantially increased capacities thereby enabling the production of refined metal in amounts greater by a factor of two or more times. This marked enlargement of tower capacity stems from the fact that the trays of my copending applications are made up of elements while those of the prior art are unitary or monolithic. Practice has shown that a monolithic tray has a size limitation beyond which the thermal expansion and contraction due to temperature changes encountered in starting up or during operation of the fractionating tower will crack or destroy the trays. As already indicated, this size limitation vanishes when the trays are formed of several elements individually capable of withstanding thermal expansion and contraction.

The erection and operation of large capacity fractionating towers, say for producing 50 tons per day or more of distilled zinc, presented the new problem of providing adequate means for generating vapor or distilling the metal at a rate commensurate with tower capacity. The towers of the prior art have generally relied on the use of furnaces enclosing the lower portion of the tower to effect boiling of the metal. This arrangement has the disadvantage that the lowermost part of the tower which has the greatest load-bearing stress is also subjected to the severest thermal stresses by the operation of the furnace. Furthermore, the heat of vaporization can be supplied by the furnace to the liquid metal in the lower portion of the tower only through the comparatively small area of the side walls of the tower.

Accordingly, a principal object of this invention is to provide a fractionating column for metallic vapors, which is equipped with means for boiling the metal at any desired rate regardless of the column size and without subjecting the column to excessive thermal stresses caused by the boiling means.

Additional objects and advantages of the invention will be evident in the description which follows.

According to this invention, a fractionating tower for metallic vapors and a boiler or means for generating the vapors are essentially separate vessels arranged substantially side by side and structurally connected to one another so that tower and boiler form a unitary fractionating apparatus wherein the firing of the boiler essentially does not impose any thermal stress on the tower other than that resulting from the flow of hot vapors from the boiler into the tower. The boiler of the unitary apparatus of this invention is basically a low vessel of considerable horizontal cross-section while the column is a tall vessel of comparatively small horizontal cross-section. To permit the apparatus to expand on heating without encountering structural failures, the boiler is positioned on a firm base while the tower tied thereto is supported on movable means, such as rollers. Thus on heating the apparatus, the tower laterally connected to the boiler is free to accommodate the expansion or "growth" of the structure by moving away from the boiler on the rollers or like supporting movable means. Conversely, when the apparatus is shut down and allowed to cool, the tower is retracted toward the boiler and structural cracks or other defects due to contraction are prevented.

For a fuller understanding of the invention, reference is now made to the accompanying drawings wherein.

Figure 1:
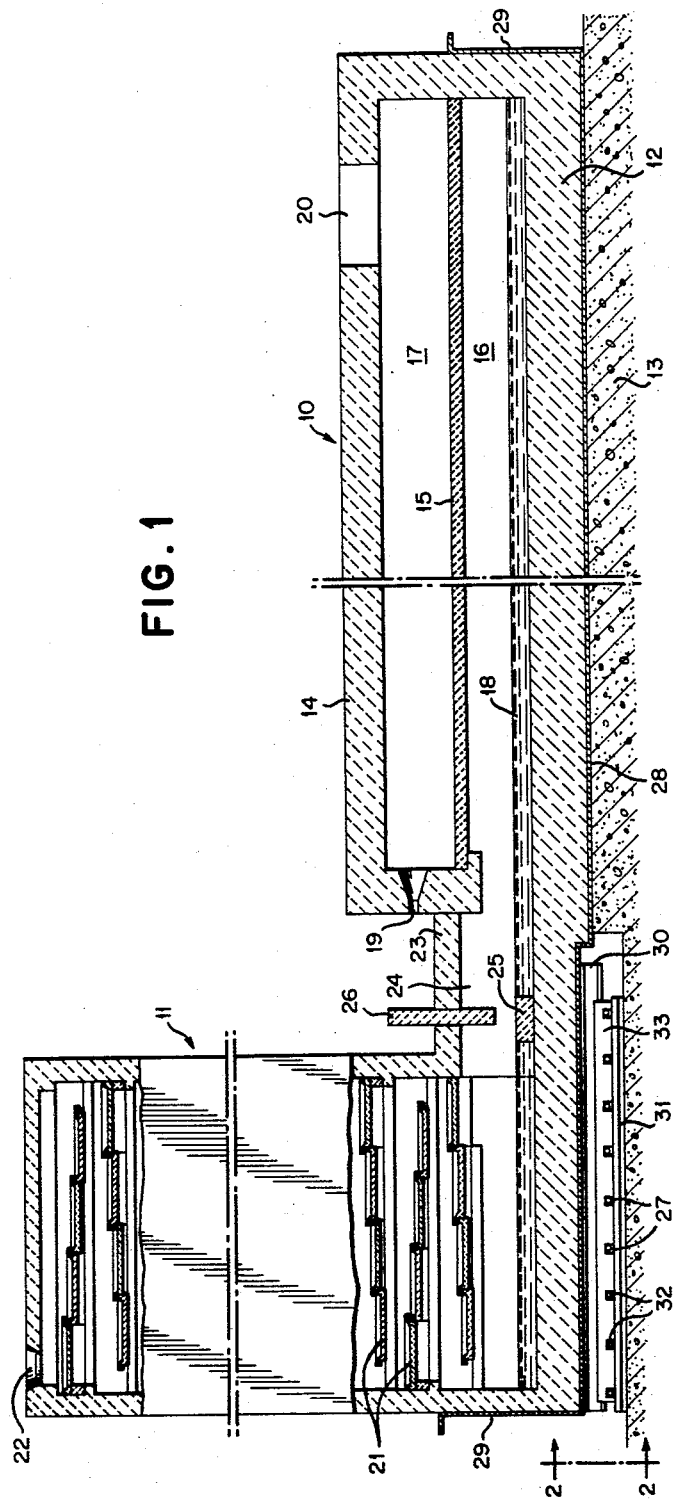
FIGURE 1 is a vertical section of a fractionating apparatus formed of refractory materials and having a boiler and column which are arranged side by side and are laterally connected for fluid flow, the column being supported on a movable base.

The unitary fractionating apparatus of FIGURE 1 comprises boiler 10 laterally joined to tower 11. The floor, walls and roof of boiler 10 are made of refractory materials like fireclay, graphite and silicon carbide, preferably in the form of blocks or bricks which may be cemented to one another in the customary way with a refractory mortar or cement. Floor 12 of boiler 10 is laid on a firm foundation 13 which supports all of boiler 10. Spaced from both floor 12 and roof 14 of boiler 10 is a radiant ceiling 15 which divides boiler 10 into lower vaporizing section 16 and upper firing section 17. A shallow pool of molten metal 18 covers floor 12 and is heated to effect vaporization by thermal energy from radiant ceiling 15. In turn, ceiling 15 is heated by the combustion of a fuel in firing section 17. While FIGURE 1 simply shows a burner 19 at one end of boiler 10 injecting a combustible mixture of a fuel, such as natural gas, and air into firing section 17, and a vent 20 for flue gases at the opposite end, in commercial practice, a recuperator will generally be used in conjunction with firing section 17 wherein incoming air and outgoing flue gases will be passed in indirect heat exchange relation to preheat the air before it enters firing section 17. For simplicity of presentation, one burner 19 is shown in FIGURE 1 but in large installations several burners are usually employed. Also, instead of all the desired quantity of air for combustion entering firing section 17 with the fuel through the burners, part may be injected through suitable ports in roof 14 spaced along the length of boiler 10. Boiler 10 is also provided in the customary manner with openings in its walls; one such opening may be used for draining lead-enriched molten zinc from pool 18 to prevent excessive accumulation of lead in boiler 10 and another such opening may serve for introducing into pool 18 make-up crude zinc from a conventional melting pot or furnace.

Column 11 comprises four vertical walls of refractory brick forming a vapor passage that is rectangular in horizontal cross-section. A plurality of trays 21 are disposed in tower 11 to provide an extensive area of contact between ascending metallic vapors from vaporizing section 16 and descending liquid metal condensed therefrom. Substantially lead-free zinc vapors discharge from the top of tower 11 through outlet 22 into a condenser for the recovery of molten zinc or into a reaction chamber in which the zinc vapors may be converted into a desired product, e.g., zinc oxide.

A short duct 23 forms the connection between boiler 10 and tower 11 and provides passage 24 communicating through a wall of boiler 10 with vaporizing section 16 and through a wall of tower 11 with the lower end of tower 11. Thus, zinc vapors flow from section 16, through passage 24 and up tower 11, while liquid metal condensed from the vapors flows down trays 21, through passage 24 and into section 16 for further boiling. Weir 25 extends across passage 24 so that molten metal dropping to the bottom of tower 11 will spill thereover, ensuring the flow of liquid from tower 11 to section 16 rather than in the opposite direction. An adjustable damper 26 is provided in the upper portion of duct 23 to restrict the flow of zinc vapors from section 16 into column 11 and even cut off flow when circumstances might arise making it desirable to do so.

The thermal expansion and contraction feature of the apparatus of this invention involves rollers 27 disposed between the base of tower 11 and foundation 13. While the floor or base of tower 11 is made of a refractory material that is resistant to molten zinc collecting thereon, a steel plate underlies the refractory floor of tower 11 and similarly extends under duct 23 and under at least part of the floor of boiler 10. This steel plate which may be made up of several sheets or sections joined to one another as by welding or riveting provides a strong structure link between tower 11 and boiler 10. Preferably the steel plate underlies all of the fractionating apparatus and has other steel plates joined angularly to the edges thereof to provide a reinforcing, exterior shell of steel around the lower portions of the walls of boiler 10 and tower 11. This steel shell or pan which encases the lower portions of boiler 10 and tower 11 desirably has walls extending upwardly to at least the level of the upper surface of the pool of molten metal maintained in the bottom of boiler 10 and tower 11. In short, the steel shell is an advisable precaution in the sense that if any crack or defect occurred in the lower portion of boiler 10 or tower 11, molten metal would not leak out of the fractionating apparatus onto the surrounding work area.

As shown in FIGURE 1, the steel shell has a floor plate 28 extending the full length and width of the fractionating apparatus and side plates 29 surrounding boiler 10, tower 11 and duct 23 to a height approximating the full height of duct 23. Thus, the steel shell acts not only as unitary structural base for the fractionating apparatus but also as a safety basin for molten metal in the event that the refractory floor or confining walls in contact with the molten metal in the apparatus developed a leak.

Figure 2:
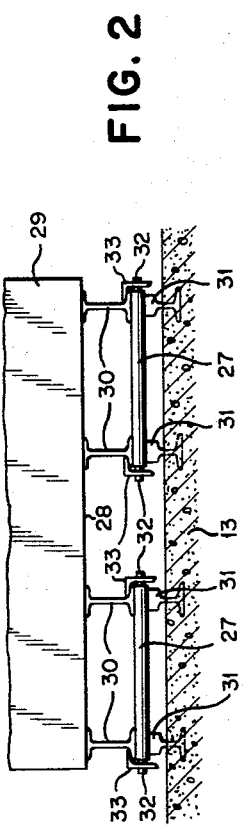
FIGURE 2 is an enlarged partial view, as indicated by line 2—2 of FIGURE 1, showing the movable base.

FIGURE 2 shows in detail the portion of the steel shell at the bottom of tower 11 directly over rollers 27. The portion of floor plate 28 under tower 11 rests on two pairs of parallel steel I-beams, each pair of which in turn rests on a plurality of spaced steel rollers 27 as shown in FIGURE 1. Desirably, two pairs of steel rails 31 are set in concrete foundation 13 so that rollers 27 ride thereon. Each roller 27 has axial extensions 32 at its opposite ends which loosely fit into slotted angle irons 33 associated with I-beams 30. The slots in angle irons 33 are spaced to hold rollers 27 the desired distance from one another as shown in FIGURE 1.

Figure 3:
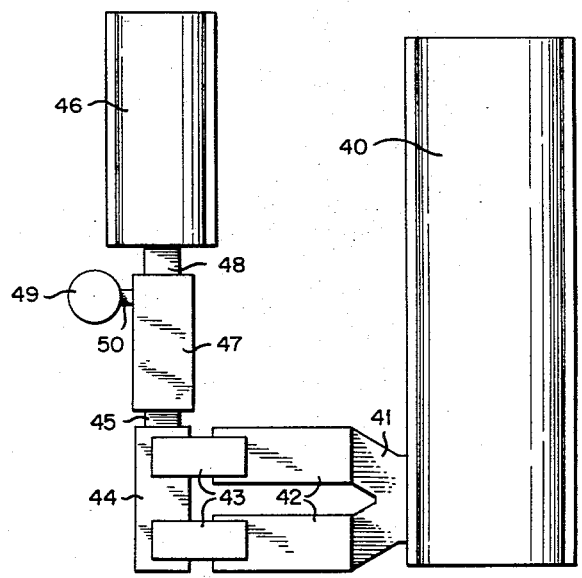
FIGURE 3 is a diagrammatic plan of a plant for fractionating lead from zinc and then further fractionating the zinc to separate cadmium, the plant having two fractionating apparatuses of the type shown in FIGURE 1.
Figure 4:
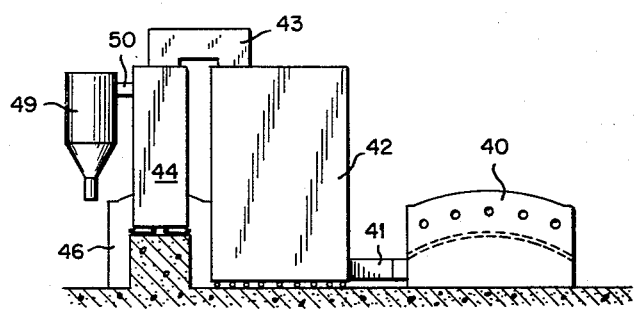
FIGURE 4 is a diagrammatic elevation of the plant of FIGURE 3, showing the fractionating apparatus in which the crude zinc is first distilled to eliminate lead.
Figure 5:
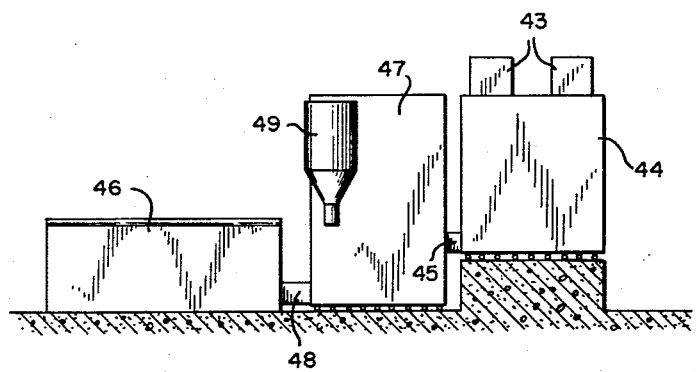
FIGURE 5 is a diagrammatic elevation of the plant of FIGURE 3, showing the other fractionating apparatus in which the lead-free zinc is further fractionated to remove cadmium.

In FIGURES 3, 4 and 5, one fractionating apparatus of this invention has boiler 40 connected by Y-shaped duct 41 to two parallel columns 42. Crude zinc containing iron, lead and cadmium as impurities charged into boiler 40 is vaporized and the metallic vapors are fractionated in parallel towers 42 so that zinc vapors substantially free of iron and lead discharge through overhead connectors 43 into condenser 44. The thus refined zinc, either entirely as liquid or partly as liquid and partly as vapor, the amount of liquefaction being controlled as desired in condenser 44 by the amount of heat abstracted, then flows through duct 45 into a second fractionating apparatus comprising boiler 46, tower 47 and connecting duct 48. Boiler 46 serves to reboil the molten zinc collecting in the bottom of column 47 for the purpose of stripping any cadmium that might flow down the trays of column 47 with liquid zinc reflux. Vapor rich in cadmium passes through overhead connector 50 into collector 49. Molten zinc substantially free of cadmium as well as lead and iron is tapped from reboiler 46 and recovered as refined product.

The two fractionating apparatuses used in the plant of FIGURES 3, 4 and 5 involve variations of the apparatus of FIGURE 1. In this plant, the apparatus which eliminates lead and iron from the crude zinc has one large boiler 40 feeding metallic vapors to two towers 42 arranged in parallel rather than a single tower. This variation gives greater operational flexibility, particularly in respect to maintenance. The other fractionating apparatus of the plant shown in FIGURES 3, 4 and 5 differs from the apparatus of FIGURE 1 in details which are dictated by the fact that in this case distilled zinc is withdrawn as liquid from reboiler 46 whereas in FIGURE 1 zinc vapors leave the fractionating apparatus at the top of column 11. Where an impurity like cadmium has a lower boiling point than that of zinc, the partially refined zinc is supplied to tower 47 at an intermediate level as shown in FIGURE 5.

In the plant of FIGURES 3, 4 and 5, the cadmium-eliminating apparatus has also structurally connected thereto condenser 44. Inasmuch as thermal expansion of this apparatus will cause movement of tower 47 away from reboiler 46 and toward condenser 44, the latter is also supported on movable means like that used under tower 47 in accordance with this invention. In this way, tower 47 and condenser 44 move serially away from and toward reboiler 46 with thermal expansion and contraction, respectively. At the same time, parallel towers 42 are free to move in a direction essentially at right angles to that tower 47 and condenser 44. To accommodate the displacement of towers 42 relative to condenser 44, connectors 43 have their opposite ends resting in openings in the tops of towers 42 and condenser 44, these openings permitting connectors 43 to swivel and thus yield to the "growth" of the two fractioning apparatuses without difficulty. Thus, in a commercial plant designed as shown in FIGURES 3, 4 and 5 to produce 50 tons per day of refined zinc, thermal distortions approaching one inch have been successfully tolerated.

As already pointed out, the fractionating apparatus of this invention may be erected on a scale heretofore found impractical with prior types of apparatus. The economic advantage of the larger installations now made possible is enhanced by still another factor, namely, the substantially reduced height of the apparatus. Previously, the fractionating tower has been superimposed on the boiler so that the heights of the two units were cumulative. Besides arranging the tower and boiler side by side to cut down the overall height, towers of the type disclosed in my aforesaid copending applications are distinctly shorter than towers of the type shown in U.S. Patents, Nos. 1,994,345 to 1,994,358, inclusive. Accordingly, this reduction in height of the apparatus leads to marked savings in capital costs for the building which will contain the apparatus, for structural supports and for service platforms and the like usually erected around the apparatus. Labor costs are also decreased because all the equipment is essentially on one floor.

Various modifications within the spirit and scope of the invention will be apparent upon consideration of the foregoing disclosure. For instance in FIGURE 3 each column 42 is connected through a narrow wall thereof with a broad side of boiler 40, while column 47 communicates through a narrow wall thereof with a narrow side of boiler 46; a column may alternatively be connected through a broad wall thereof with a narrow or broad side of its boiler. The tower may be provided with heating means, particularly radiation refractory tubes, disposed between the individually supported trays within the lower portion of the tower as disclosed in my copending application Serial No. 686,317, filed September 26, 1957, now Patent No. 3,045,995, so that the temperature along the height of the tower may be adjusted as desired. Such radiation tubes would preferably be included in a cadmium-eliminating column like column 47 of FIGURE 3. Accordingly, only such limitations should be imposed on the invention as are set forth in the appended claims.

What is claimed is:

1. In a fractionating apparatus formed of refractory materials, comprising a boiler, a column for contacting ascending hot vapors generated by said boiler with descending liquid condensed from said vapors, and a duct connecting said column with said boiler through lateral walls of said column and said boiler, the combination therewith of a steel plate underlying the floor of said column and extending under said duct and under at least part of the floor of said boiler to provide a structural link between said column and said boiler, and movable means disposed below the portion of said plate underlying the floor of said column whereby thermal exapnsion and construction of said fractionating apparatus is accommodated by movement of said column on said movable means away from and toward said boiler, respectively.

2. The fractionating apparatus of claim 1 wherein the movable means comprises a plurality of spaced rollers disposed substantially at right angles to the direction of movement of the column with thermal expansion and contraction.

3. The fractionating apparatus of claim 1 wherein the underlying steel plate is joined to other steel plates to form a basin which encases the duct and the bottom portions of the boiler and column.

4. In a fractionating apparatus formed of refractory materials, which comprises a boiler having a radiant ceiling extending across an intermediate level thereof and dividing said boiler into an upper firing section and a lower vaporizing section, a tower with vertically spaced trays for contacting ascending hot vapors with descending liquid condensed therefrom, and a duct connecting said boiler and said tower and providing a passage for fluid flow between said vaporizing section of said boiler and the lower portion of said tower, the combination therewith of a steel plate underlying the floor of said tower and extending under said duct and under at least part of the floor of said boiler to provide a structural link between said tower and said boiler, and movable means positioned below the portion of said plate underlying the floor of said tower to facilitate movement of said tower away from and toward said boiler with thermal expansion and contraction, respectively, of said fractionating apparatus.

5. The fractionating apparatus of claim 4 wherein the movable means comprises a plurality of spaced rollers disposed substantially at right angles to the direction of movement of the tower with thermal expansion and contraction.

6. The fractionating apparatus of claim 4 wherein the underlying steel plate is joined to other steel plates to form a basin which encases the duct and the bottom portions of the boiler and tower.

7. In a plant for refining crude zinc containing lead and cadmium as impurities by distillation, which comprises a lead-eliminating fractionating apparatus formed of refractory materials and having a boiler and tower connected to each other by a first duct through lateral walls of said boiler and said tower, a cadmium-eliminating fractionating apparatus formed of refractory materials and having a reboiler and a refractionating tower connected to each other by a second duct through lateral walls of said reboiler and said refractionating tower, and fluid flow means providing communication between the top portion of said tower and an intermediate portion of said refractionating tower, the combination therewith of a first steel plate underlying the floor of said tower and extending under said first duct and under at least part of the floor of said boiler to provide a structural link between said tower and said boiler, a first movable means disposed under the portion of said first plate underlying the floor of said tower to facilitate movement of said tower away from and toward said boiler with thermal expansion and contraction, respectively, of said lead-eliminating fractionating apparatus, a second steel plate underlying the floor of said refractionating tower and extending under said second duct and under at least part of the floor of said reboiler to provide a structural link between said refractionating tower and said reboiler, and a second movable means disposed under the portion of said second plate underlying the floor of said refractionating tower to facilitate movement of said refractionating tower away from and toward said reboiler with thermal expansion and contraction, respectively, of said cadmium-eliminating fractionating apparatus.

8. The plant of claim 7 wherein each of the first and second movable means comprises a plurality of spaced rollers disposed substantially at right angles to the direction of movement resulting from thermal expansion and contraction.

References Cited in the file of this patent

UNITED STATES PATENTS

| | | |
|---|---|---|
| 1,994,352 | Ginder et al. | Mar. 12, 1935 |
| 1,994,358 | Holstein et al. | Mar. 12, 1935 |
| 2,333,579 | Renkin | Nov. 2, 1943 |
| 2,552,430 | Jackson | May 8, 1951 |
| 2,712,426 | Banks | July 5, 1955 |
| 2,802,657 | Nesbitt et al. | Aug. 13, 1957 |

OTHER REFERENCES

Refractories by F. H. Norton, 3rd edition, published by McGraw-Hill Book Co., Inc., New York, N.Y., 1949, pages 684–693. (Copy in Scientific Library.)